United States Patent [19]

Harr

[11] 4,132,118

[45] Jan. 2, 1979

[54] PISTON POWER GENERATING AND WORKING MACHINE

[76] Inventor: Ewald Harr, Heilbronner Strasse 19, Schwaigern 2, Germany, 7103

[21] Appl. No.: 761,000

[22] Filed: Jan. 21, 1977

[30] Foreign Application Priority Data

Jan. 23, 1976 [DE] Fed. Rep. of Germany ....... 2602436
Mar. 16, 1976 [DE] Fed. Rep. of Germany ....... 2610969

[51] Int. Cl.² .............................................. F16H 21/22
[52] U.S. Cl. .................................... 74/44; 123/45 R
[58] Field of Search .................. 74/595, 44; 123/45 R

[56] References Cited

U.S. PATENT DOCUMENTS 3,824,970 7/1974 Amery .............................. 123/45 R Primary Examiner—Benjamin W. Wyche
Attorney, Agent, or Firm—Wigman & Cohen

[57] ABSTRACT

A piston machine useful as a power generating machine or a working or pumping machine is disclosed. One or a plurality of double-acting pistons having eccentric piston shafts are guided in cylindrical combustion or working chambers of a machine housing. By means of a driving joint mechanism, the pistons translate along and pivot about their longitudinal axes in oscillatory movements to either drive or be driven by an output shaft.

18 Claims, 10 Drawing Figures

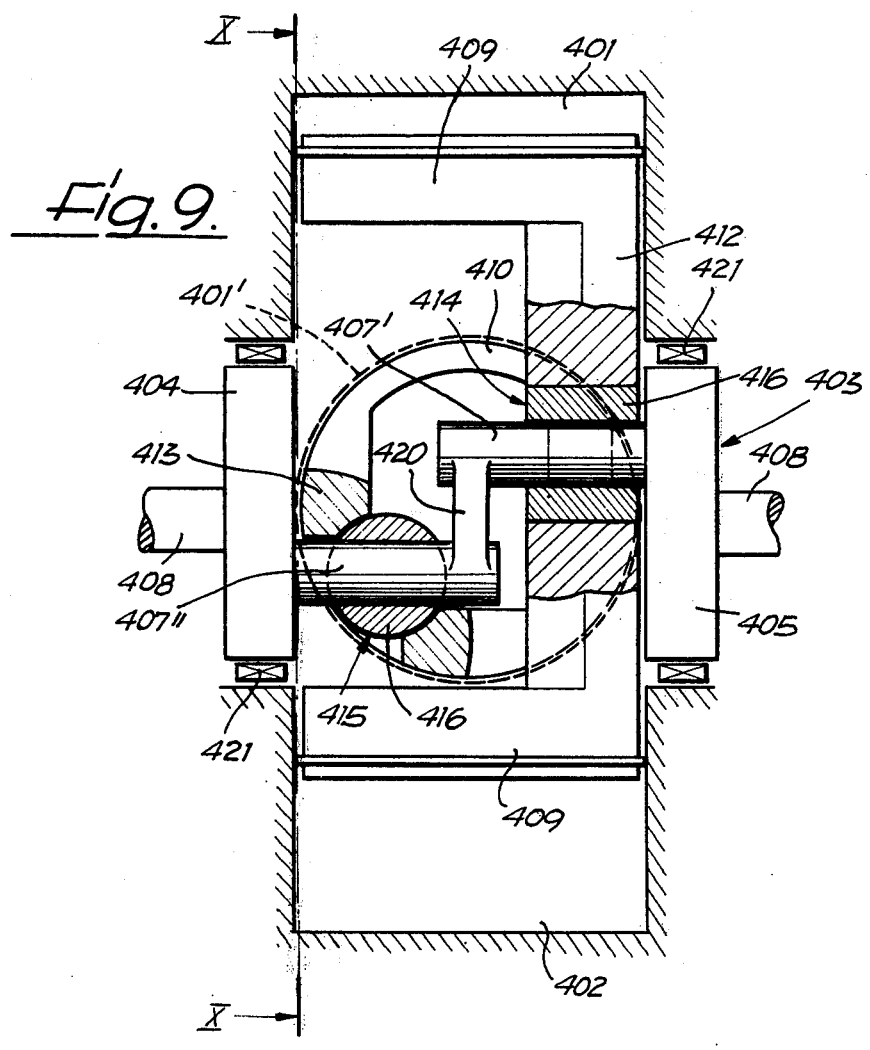

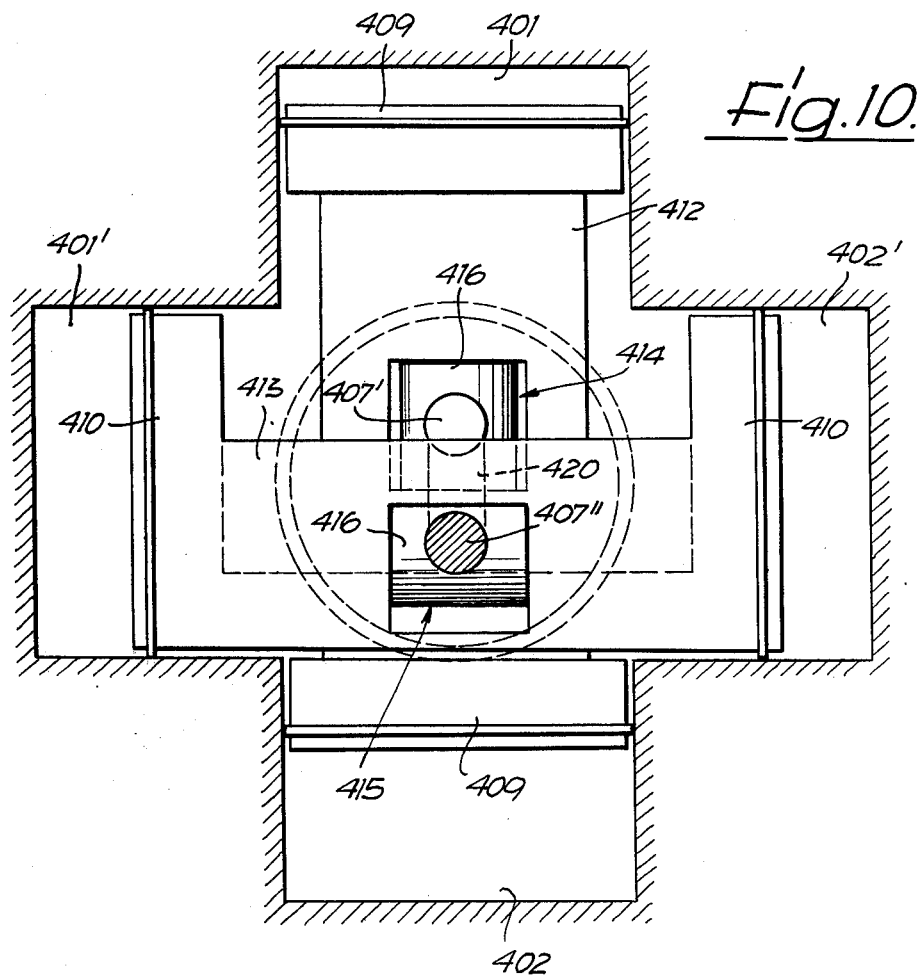

PISTON POWER GENERATING AND WORKING MACHINE

BACKGROUND OF THE INVENTION

This invention relates to a piston power machine and piston working machine having a jacket enclosing at least one cylindrical generating chamber, at least one piston in the generating chamber which can be moved back-and-forth in the direction of its longitudinal axis as well as rotated about its longitudinal axis. A driving joint mechanism is connected with the piston and in response to the back-and-forth movement of the piston, applies a rotary motion to the piston about its longitudinal axis and converts the piston motion into rotary motion of a driving shaft or, conversely, the rotary motion of a driving shaft into the piston motion.

SUMMARY AND OBJECTS OF THE INVENTION

It is an object of the present invention to provide a piston machine in such a manner that, without difficulties and particularly without additional expenditure for the driving joint, several cylinders can be arranged adjacent each other with their pistons connected to a common shaft. The invention solves this problem by the fact that the driving joint is designed as a crankshaft, the shaft journals of which are arranged diagonally to the direction of the stroke of the piston and form the driven end of the shaft or the driving shaft. The crankpin of the crankshaft is connected with the piston over a joint which is movable in a longitudinal direction along the crankpin.

The expenditure for and the space requirement of the driving joint is low and it is sufficient, if, instead of only one cylinder, several cylinders are provided adjacent each other, to extend the crankshaft accordingly whereby the cylinders can be placed in staggered relation to each other in the circumferential direction of the crankshaft. An additional advantage of such a driving joint, independently of the number of the cylinders, consists of the fact that no pinions or the like are required in order to transmit the movement of the piston to the driven end of the shaft or the rotation of the driving shaft to the piston or pistons.

Instead of extending the crankshaft, or in addition to it, also a second driving joint, which can be moved in longitudinal direction, can be arranged on the crankpin through which at least an additional piston is connected to the driven end of the shaft or to the driving shaft.

In this way, it is not only possible to provide an opposed cylinder arrangement, but also an extremely compact radial construction with four pistons or two double pistons can be achieved. It is, furthermore, an advantage that an excellent mass equilibrium can be achieved with a relatively low expenditure. In order that the two joints are always placed in phase opposition, the crankpin consists, in the case of a preferred design, of two sections which are connected with each other and are placed diametrically with regard to the axis defined by the shaft journals, with the sections each carrying one of the joints. The same effect can be obtained with an undivided crankpin when this crankpin forms an acute angle with the axis defined by the shaft journals and this axis cuts through the center between the two crank webs.

Particularly favorable conditions are obtained when the longitudinal axis of the crankpin passes through the center of gravity of the piston or a straight line passing through the center of gravity and parallel to the longitudinal axis of the piston cuts through the longitudinal axis of the crankpin.

In the case of a particularly advantageous design, the longitudinal axis of the crankpin forms an acute angle of, preferably, about 45° with the longitudinal axis of the piston and the longitudinal axis of the shaft journals. In this way, a particularly favorable path of the motion of the center of gravity of the piston is obtained. It is especially expedient, in this instance, to arrange the crankpin in such a manner that its longitudinal axis cuts through the longitudinal axis of the piston.

Different designs are possible for the driving joint between the crankpin and the piston. A ball-and-socket joint can, for example, be provided, the ball of which is located on the crankpin in such a way that it is movable in the longitudinal direction of the crankpin. A joint with a sleeve placed on the crankpin, which is connected with the piston and is pivotable about an axis perpendicular to the longitudinal axis of the crankpin, involves special advantages and this, in particular, when it is a question of designs with a crankpin being placed at an angle to the shaft journals. If the crankpin extends in an acute angle to the shaft journals, then the sleeve can be connected with the piston by means of two jointed pins the longitudinal axes of which lie in a common plane on which the longitudinal axis of the piston is perpendicularly disposed.

The invention is explained in greater detail herein by means of the several embodiments shown in the drawings, wherein:

BRIEF DESCRIPTION OF THE DRAWINGS

FIG. 9 is a schematically shown longitudinal cross-section of the fifth embodiment of the invention; and FIG. 10 is a section taken along line X—X of FIG. 9.

DETAILED DESCRIPTION OF A PREFERRED EMBODIMENT

Figure 1:
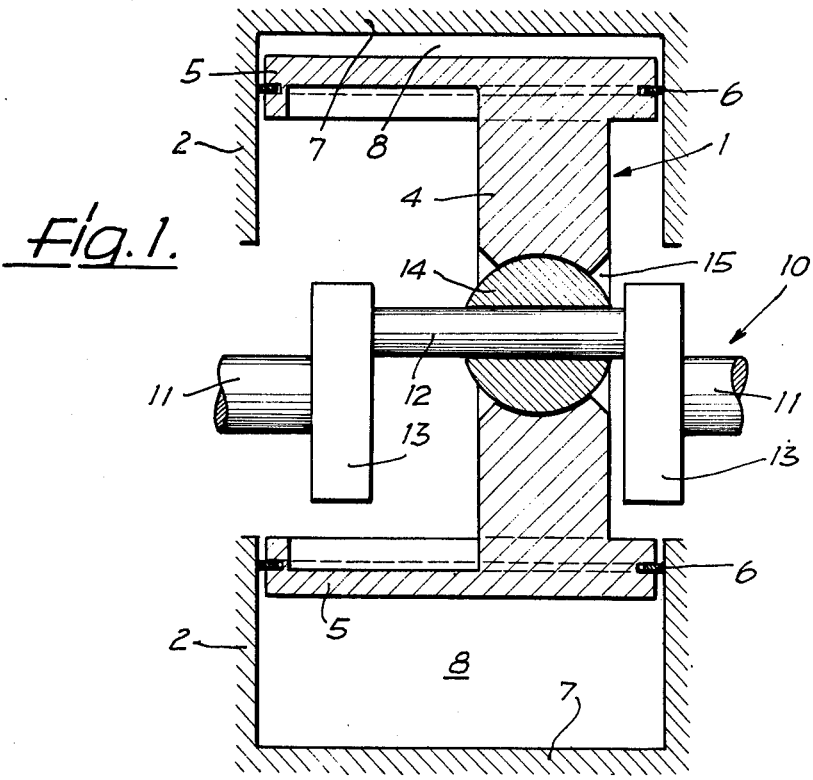
FIG. 1 is a schematically shown longitudinal cross-section of a first embodiment of the invention.
Figure 2:
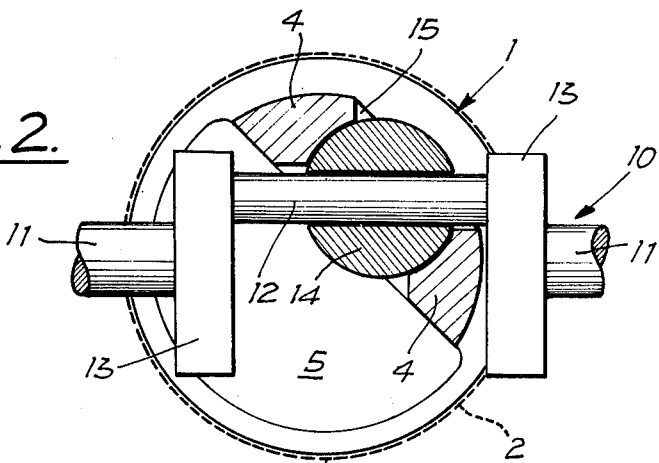
FIG. 2 is a schematically shown cross-sectional view of the piston end of the joint of the first embodiment.

The first embodiment of the invention shown in FIGS. 1 and 2 has a double-acting piston 1, having two similarly arranged piston heads 5 with circular cross sections. The pistons 5 have a relatively insignificant axial length and are each provided with a piston ring 6. The two piston heads 5 are connected with each other by means of an eccentrically positioned piston shaft 4 having a sector-shaped cross section such that the radius of curvature of the cylindrical outer surface of the piston shaft 4 is somewhat smaller than the radius of curvature of the outer surface of the piston heads 5. Owing to this design, the center of gravity of piston 1 is disposed in the piston shaft 4 outside the longitudinal axis of the piston heads 5, i.e., eccentric thereto.

The two piston heads 5 are each received in a respective cylinder in a manner permitting longitudinal and rotational motions therein. Each cylinder consists of a jacket 2 and a cylinder end wall 7. The two identical cylinders are coaxially arranged and connected with each other in a manner not shown in the drawings. However, it is also possible to provide a common jacket for both cylinders with penetrations in that area of the jacket which does not limit the two combustion or power generating spaces 8. Valves and openings associated with the spaces 8 for the supply and discharge of fuel and air, when designed as an internal combustion machine, or of a working medium in the case of a working machine or pump design, are not shown, but can be provided in a known manner.

A crankshaft, the overall construction of which is designated by reference numeral 10, is provided as a means for the conversion of the movement of the piston 1 into a rotary motion of the driven end of a driving shaft or the conversion of the rotary motion of a driving shaft into the motion of the piston. The longitudinal axis of the two shaft journals 11 cuts through the longitudinal axis of the piston 1 and of the two cylinders in the plane equidistant between the two end walls 7. The crankpin 12 of the crankshaft 10, is connected with the shaft journals 11 in the customary manner by means of two crank webs 13 and is parallel and eccentrically arranged to the longitudinal axis of the shaft journals 11. A ball 14 of a ball-and-socket joint, connecting the crankshaft 10 with the piston 1, is mounted on the crankpin 12 in such a manner that it is pivotable as well as shiftable in the longitudinal direction of the crankpin 12. The ball 14 is pivoted in the piston shaft 4, for which purpose the piston shaft is provided with a penetration 15 which has two spherical segments arranged symmetrically with respect to the transverse median plane of the piston 1, the segments comprising bearing surfaces for the ball 14. As is shown in the drawings, the penetration 15 is conically enlarged towards both ends so that, as best seen in FIG. 2, the crankpin does not contact the piston shaft 4.

Instead of the ball 14, a cylindrical element could be used, the longitudinal axis of which is parallel with the longitudinal axis of the piston and, preferably passes through the center of gravity of the piston. Such an element would be provided with a bore hole for the crankpin 12, penetrating the element in the radial direction, and would be supported in the penetration 15 in such a manner that it would be pivotable about its longitudinal axis. A cross-section of such design according to FIG. 2 would result in the same sectional view as shown therein.

As is shown in FIGS. 1 and 2, the crank webs 13 can either be entirely or partially arranged in the space between the two piston heads 5. The distance between the webs 13 results from the necessary shifting range for the ball 14 on the crankpin 12 and, as is shown in FIG. 2, from the arcuate angle of rotation of the piston shaft 4.

During operation, the piston 1 performs a rotary motion around its longitudinal axis in addition to the translational motion resulting from the movement of stroke since, as is shown in FIG. 2, the motion of the crankpin 12 induces a shifting, in a direction diagonally to the direction of the stroke, of the center of gravity of the piston 1 which passes through the center of the ball 14 and lies thus on the longitudinal axis of the crankpin 12. This motion leads to a movement of the center of gravity on a circular path about the longitudinal axis of the piston owing to the fact that the ball 14 is movable about in a longitudinal direction on the crankpin 12. Therefore, the path taken by the center of gravity of the piston 1 during each stroke consists of the longitudinal stroke movement and a to-and-fro rotary motion in a transverse plane.

The crankshaft 10 can be extended towards one of the two sides so that a design with several cylinders, as it is customary for piston engines, can be achieved without any difficulties.

With a suitable selection of the eccentricity of the crankpin 12, i.e., when the piston in the position according to FIG. 2 has been subjected to a turn by 90° in comparison with the position according to FIG. 1, a continuously constant direction of rotation of the piston 1 around its longitudinal axis can be provided.

Figure 3:
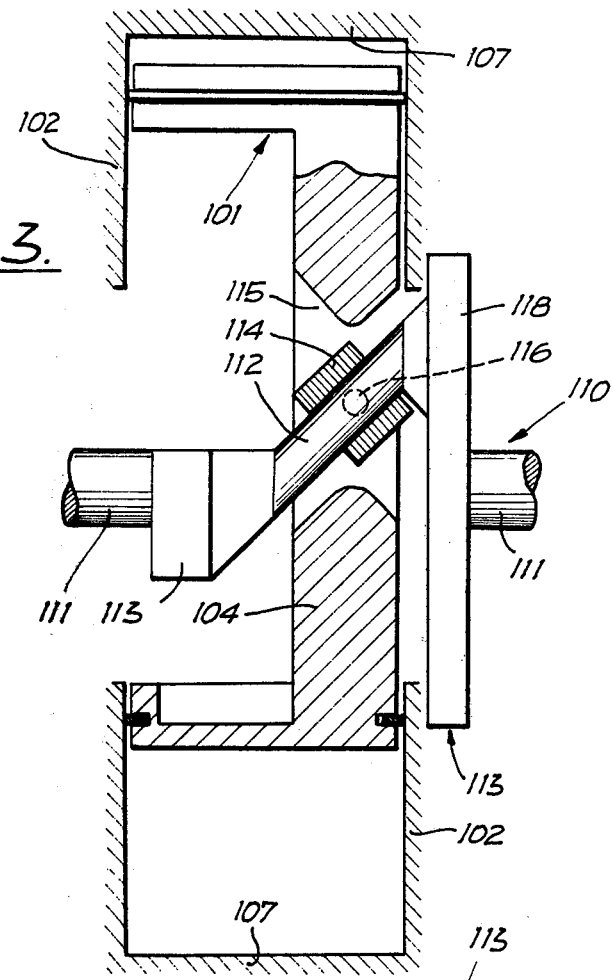
FIG. 3 is a schematically shown longitudinal cross-section of a second embodiment of the invention.
Figure 4:
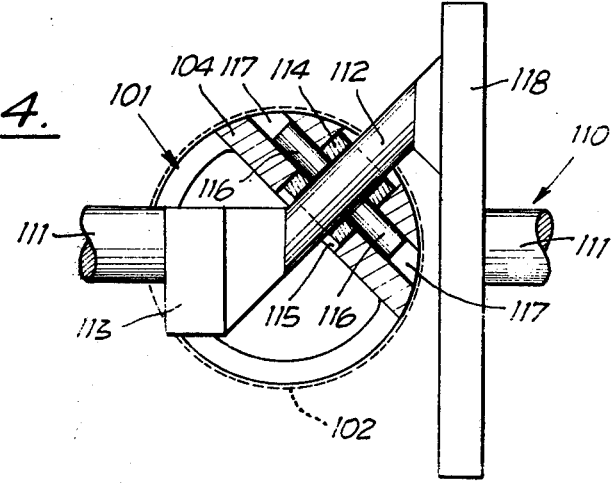
FIG. 4 is a schematically shown cross-sectional view of the piston and of the joint of the second embodiment.

The embodiment of the invention shown in FIGS. 3 and 4 differs from that according to FIGS. 1 and 2 essentially by an alternate design of the crankshaft 110. With the exception of the penetration 115, the piston 101 is designed in the same manner as the piston 1. It goes without saying that other piston forms can also be utilized in this instance as in the case of the first embodiment. By the same token, the two cylinders with their jacket 102 and their end wall 107 are, in principle, designed in the same way as in the case of the first embodiment.

The longitudinal axis of the crankpin 112 of the crankshaft 110 forms an angle of about 45° with the longitudinal axis of the two shaft journals 111 and cuts, at the same angle, through the longitudinal axis of the piston 101 in the transverse median plane of the two cylinders. The two crank webs 113 have a different design. One of them is designed as driven plate 118 and, if required, counterweights can be provided at the crank webs.

A sleeve 114, which is arranged in the penetration 115 of the piston shaft 104, is placed on the crankpin 112 in such a manner that it can be pivoted and shifted in the longitudinal direction of the crankpin for the connection of the crankpin 112 with the piston shaft 104 of the piston 101. Two jointed pins 116, engaging into the sleeve 114 in radial directions at diametrical points, are received in a bore 117 of the piston shaft 104 by means of bearings, which are not shown. This bore hole is in the transverse median plane of the piston 101 and passes through its center of gravity.

As is shown in FIG. 3, the penetration 115 essentially consists of two sections conically enlarged towards the outside thereof which permits movement of the sleeve 114 past the conical surfaces, said movement being determined by the longitudinal axis of the crankpin.

As in the case of the embodiment according to FIGS. 1 and 2, during operation, the center of gravity of the piston 101 makes a back-and-forth translational motion and, simultaneously, a back-and-forth rotational motion around the longitudinal axis of the piston 101.

It would be possible to eliminate one of the two crank webs, for example, the crank web 113, without changing the course of the motions of the piston, i.e., by designing the crankpin 112 as a pin freely projecting from one of the crank webs.

As in the case of the embodiment according to FIGS. 1 and 2, no gears are required for the conversion of the piston motion into the rotary motion of the shaft journals 111 or for the conversion of the rotary motion of the latter into motion of the piston 101. Furthermore, the crankshaft 110 can be extended towards one of the two sides so that the customary construction with several cylinders can be achieved.

Figure 5:
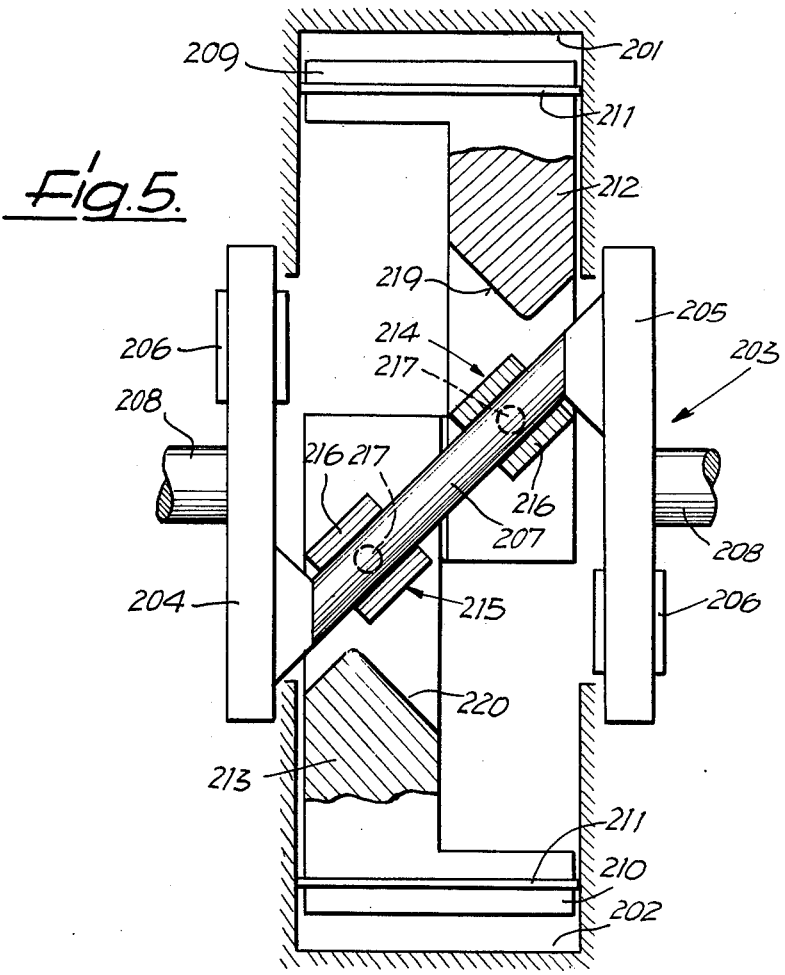
FIG. 5 is a schematically shown longitudinal cross-section of a third embodiment of the invention.

The two-cylinder engine shown in FIG. 5, represents an internal combustion engine, but which could also be a pump, and has two cylinders 201 and 202 arranged coaxially opposite each other, i.e., in an opposed arrangement. A crankshaft, the overall construction of which is designated by reference numeral 203, is arranged in the plane of symmetry between the two cylinders 201 and 202. Two crank webs 204 and 205, both of identical design, are designed as driven plates and support counterbalance weights 206 which are staggered by 180°, i.e., in phase opposition. The crankpin 207 of the crankshaft 203 extends from the crank web 204 from a point diametrical to its counterbalance weight 206 to a point diametrical to the counterbalance weight 206 of the crank web 205, the radial distance of the crankpin 207 at the webs 204, 205 from the longitudinal axis of the shaft journals 208 of the crankshaft 203 being the same. The longitudinal axis of the crankpin 207, therefore, cuts through the longitudinal axis of the shaft journals 208 in the center between the two crank webs 204 and 205 at an angle of about 45°.

A piston 209 or 210, which can be shifted in the longitudinal direction of the cylinder and pivoted about the cylinder axis, is arranged in a respective one of the two cylinders 201 and 202, the longitudinal axes of which pass through the point of intersection of the crankpin 207 with the longitudinal axis of the shaft journals 208. The design of both pistons is identical and their cylindrical piston heads have at least one piston ring 211. Adjacent each piston head, 209, 210 there is a piston shaft 212, 213, respectively, located eccentrically of the piston head and is semicircular in cross-section. The piston shafts 212, 213 extend toward the crankshaft 203 and are connected with the crankpin 207 by means of joints 214, 215, respectively. Owing to the semicircular cross-section and the staggered installation, as well as the rotary motion of the two pistons about their longitudinal axes always being in the same direction, the two piston shafts 212 and 213 do not interfere with each other as they move relatively.

The two joints 214 and 215 are of identical design and each has a bushing or sleeve 216 which is mounted on the crankpin 207 in such a manner that it can be shifted in the longitudinal direction and is pivotable. Two jointed pins 217 project from each bushing 216 in the radial and diametrical direction of the bushing and engage in boreholes 218 of the piston shafts 212, 213, respectively, as is particularly shown in FIG. 6.

Figure 6:
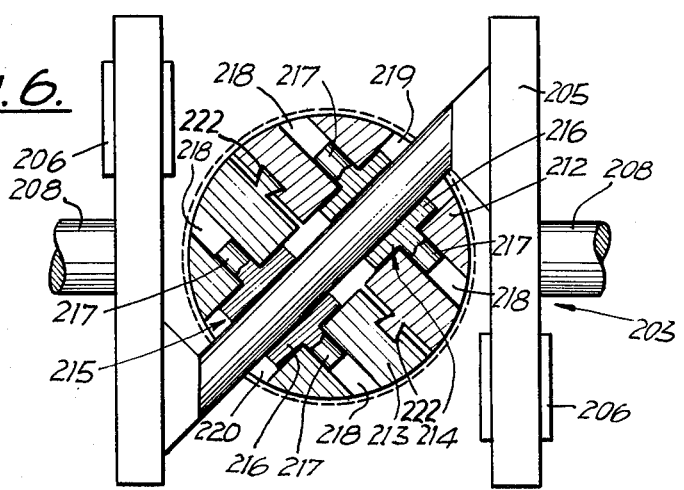
FIG. 6 is a schematically shown cross-sectional view of the third embodiment with a position of the crankshaft turned by 90° in comparison with the position according to FIG. 5.

FIG. 6 also shows recesses 219 and 220 in the piston shafts 212 or 213, respectively, which have the form of a slot in which the bushing 216 of the joints and the crankpin 207 are guided.

When the shaft journals 208 of the crankshaft 203 rotate, the two pistons 209 and 210, proceeding from the upper dead center position shown in FIG. 5, approach each other with the same speed. Furthermore, they rotate around the longitudinal axis of the cylinder in the same direction and to the same degree and that by 45° up to the mid-point of the stroke in the example of the design as shown in FIG. 6. The direction of rotation then reverses at the mid-point of the stroke until again a reversing of the direction of rotation is effected during the return stroke at the mid-point of the stroke. Owing to the double motion of the translational motion of both pistons 209 and 210, a mass equilibrium can be achieved together with the counterbalance weights 206.

In order that the piston shafts 212 and 213 can support each other, thus avoiding forces tending to urge the pistons against the cylinder wall, they are provided with guides which extend in the longitudinal direction of the shafts and engage into each other in a form-locking manner in a radial direction. In the embodiment shown, they are designed as dovetail guides 222. For the same purpose, the bushings 216 could also be rigidly connected with each other or resiliently connected by means of a spring.

Figure 7:
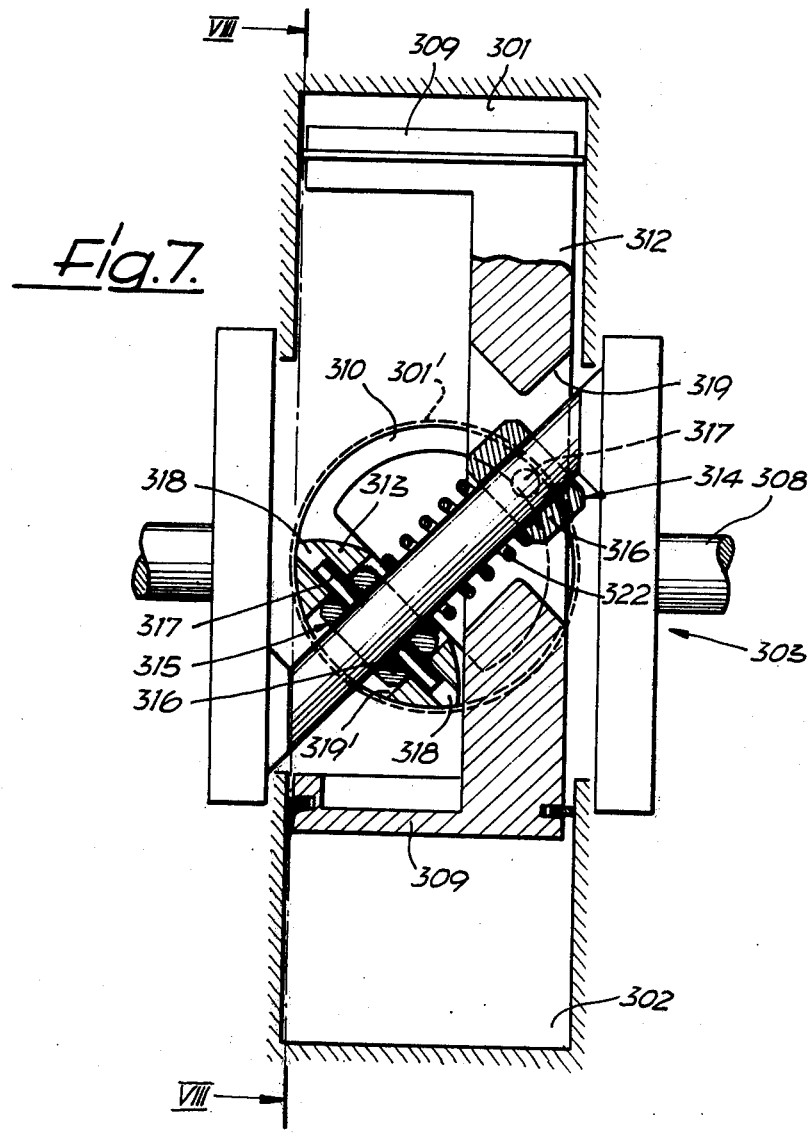
FIG. 7 is a schematically shown longitudinal cross-section of a fourth embodiment of the invention.
Figure 8:
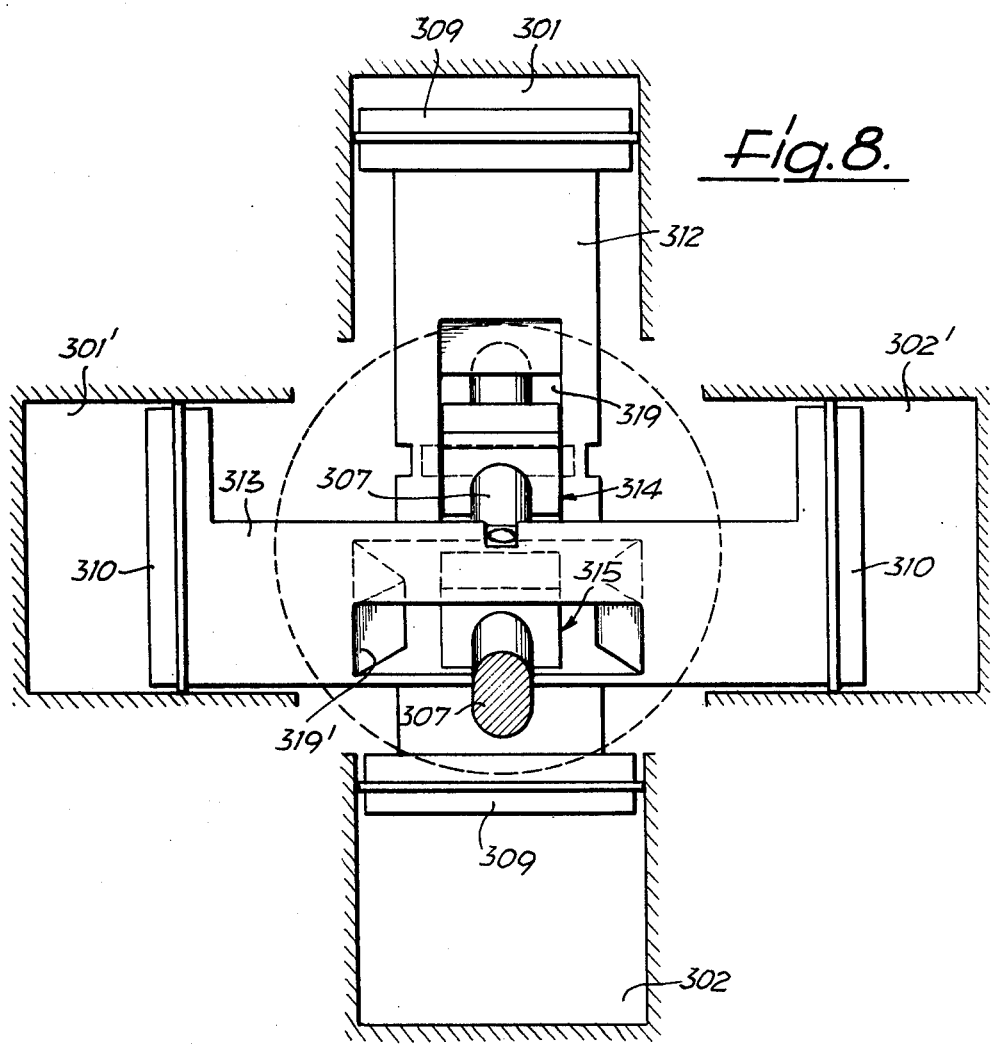
FIG. 8 is a section taken along line VIII—VIII of FIG. 7.

If, instead of the two pistons of the embodiment according to FIGS. 5 and 6, one double piston each is provided, then, as shown in FIGS. 7 and 8, an extremely compact machine in the form of a star with four generating or combustion chambers can be obtained together with a crankshaft, the overall construction of which is designated generally by reference numeral 303. This crankshaft 303 is designed as the crankshaft 203. As is particularly shown in FIG. 8, the longitudinal axis of the two cylinders 301 and 302, which are provided with a double piston 309, cuts through the longitudinal axis of the cylinders 301' and 302', with the latter being provided with a double piston 310 which has the same design as the double piston 309. Furthermore, the two longitudinal axes of the cylinder pairs cut through the longitudinal axis of the shaft journals 308 of the crankshaft 303 at a right angle. The double piston 309 has two cylindrical piston heads which are connected with each other by an eccentrically arranged piston shaft 312, the cross-sectional form of which is similar to two connected circular segments as can be seen from FIG. 7. This cross-sectional form, on the one hand is due to the fact that the piston shaft is placed within the two cylinders 301 and 302 and, on the other hand, is intended to prevent interference with the motion of the other piston shaft 313 which connects the piston heads of the other double piston 310 with each other.

As is shown in FIG. 7, the piston shaft 312 is provided with a slot 319 which is axially located in its center section. The piston shaft 313, which is of identical design, has a correspondingly designed slot 319'. The two joints 314, 315, respectively, are located in these two slots and connect the double pistons with the crankpin 307. The two joints 314, 315 can be rigidly connected with each other or, through an elastic intermediate element such as a spring 322, for example, in order to be able to compensate for the forces acting in the longitudinal direction of the crankpin and thus to avoid the forcing of the pistons against the cylinder walls. The form of the slots 319, 319', which extend towards the outside and towards the inside in the longitudinal direction of the piston shaft, is determined by the space required for the crankpin 307 and the joint and the width of the slots by the dimensions of the bushings 316 which are placed on the crankpin in such a manner that they can be shifted in the longitudinal direction and can be pivoted, and which rest against the sides limiting the slots. As in the case of the embodiment according to FIGS. 5 and 6, two jointed pins 317 project from each bushing 316 in radial and diametrical directions and pivot in boreholes 318 of a respective piston shaft. The longitudinal axes of the boreholes 318 are located in a plane which is perpendicularly penetrated by the longitudinal axis of the respective cylinders.

With a rotary movement of the shaft journals 308, both double pistons 309 and 310 translate back-and-forth and also oscillate in a rotary movement about their longitudinal axes.

In this instance, one of the double pistons is at midpoint of the stroke when the other double piston is in its dead center position and vice-versa. Correspondingly, one of the double pistons is at the point of the reversal of the direction of rotation while the other double piston just passes through the center line of its oscillating movement.

The example of a design shown in FIGS. 9 and 10 also represents an arrangement of four cylinders 401, 402, 401', 402' in the form of a star. Two double pistons 409, 410, respectively, are arranged in these cylinders in such a way that they can be shifted in their respective longitudinal direction and pivoted about their longitudinal axes and are connected with a common crankshaft 403 by means of the joints 414, 415, respectively. In principle, the embodiment according to FIGS. 9 and 10 is the same as that of the embodiment according to FIGS. 7 and 8.

A difference in comparison with the last-mentioned embodiment consists of the fact that, as is particularly shown in FIG. 9, the crankshaft 403 has a split crankpin, the two parts 407' and 407" of which are each parallel to the longitudinal axis of the shaft journals 408 and are eccentrically, but in opposite directions, arranged vis-a-vis this longitudinal axis by the same amount. The two parts 407' and 407" of the crankpin are connected with each other by means of a connecting piece 420 in the center between two crank webs 404 and 405.

Each of the two parts 407' and 407" of the crankpin carries one of the two joints 414 or 415, respectively, by means of which the crankpin is connected with the eccentrically located piston shaft 412 or 413, respectively, of the respective double piston 409, 410. The cross-section of the two identical piston shafts is shown in FIG. 9 for the shaft 413. The two piston shafts 412 and 413 do not interfere with each other when performing their combined longitudinal and rotary movements owing to the convex form of the outer surface of the piston shaft towards the longitudinal axis of the respective cylinders which cuts through the longitudinal axis of the two other cylinders at a right angle as well as the axis defined by the shaft journals 408.

The two identical joints 414 and 415 each have a cylindrical bushing 416 which is provided with a borehole axially penetrating it in the radial direction to support the respective part of the crankpin. The two front faces of the bushing 416 confront one or the other piston head of the respective double piston and rest against plane bearing surfaces of the piston shaft. It goes without saying that antifriction bearings can also be utilized.

As is shown in FIG. 9 in connection with the joint 415, the outer surface of the bushing rests against two correspondingly curved guide surfaces of the piston shaft. In this manner, the bushing 416 permits a rotary motion of the crankpin part in the borehole which receives it, as well as a rotation around its longitudinal axis relative to the piston shaft. Therefore, with one rotation, the crankshaft 403 causes the two double pistons 409 and 410 not only to perform a translational motion but, simultaneously, also an oscillating rotary motion around the longitudinal axis of the cylinders receiving them, as is also the case of the embodiment according to FIGS. 7 and 8.

It is implied by means of the bearings 421 that the crankshaft 403 can also be supported in the area of the crank webs 404 and 405 which are designed as disks.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. A piston power machine and piston working machine comprising a jacket enclosing at least one cylindrical generating chamber, at least one piston having a longitudinal axis and arranged in said generating chamber, said piston being reciprocatingly movable in the direction of said longitudinal axis and pivotally movable about said longitudinal axis, a rotatable shaft operatively associated with said piston, means connecting said piston and said shaft and responsive to the movement of said piston or the rotation of said shaft for converting, respectively, the piston motion into a rotational motion of said shaft or the rotational motion of said shaft into the piston motion, said motion converting means including a crankshaft having at least one shaft journal arranged at an angle to the direction of the reciprocating movement of said piston, said shaft journal having a longitudinal axis and being connected to said rotatable shaft, said crankshaft including a crankpin having two ends and a longitudinal axis, a crank web rigidly affixed at each end of said crankpin, said motion converting means further including a joint connecting said piston to said crankpin, said joint being movable along the longitudinal axis of said crankpin between said crank webs.

2. A machine according to claim 1, wherein the longitudinal axis of said crankpin passes through the center of gravity of said piston.

3. A machine according to claim 1, wherein the longitudinal axis of said crankpin intersects a straight line parallel to the longitudinal axis of said piston and passing through the center of gravity thereof.

4. A machine according to claim 1, wherein the longitudinal axis of said crankpin forms an acute angle with both the longitudinal axis of said piston and the longitudinal axis of said shaft journal.

5. A machine according to claim 4, wherein said acute angle is about 45°.

6. A machine according to claim 4, wherein the longitudinal axis of said crankpin intersects the longitudinal axis of said piston.

7. A machine according to claim 1, wherein said joint comprises a ball-and-socket including a ball, said ball being mounted on said crankpin.

8. A machine according to claim 1, wherein said joint includes a bushing mounted to said crankpin, said bushing being articulatingly connected to said piston for swiveling movement about an axis perpendicular to the longitudinal axis of said crankpin.

9. A machine according to claim 8, wherein said bushing is connected to said piston by jointed pins the axes of which are arranged in a median plane of the piston perpendicular to the longitudinal axis thereof.

10. A machine according to claim 1, wherein said jacket encloses a second cylindrical generating chamber and a second piston arranged in said second chamber and movable in the same manner as said one piston, said motion converting means including a second joint connecting said second piston to said crankpin and being movable along the longitudinal axis of said crankpin.

11. A machine according to claim 10, wherein said crankpin comprises two sections arranged diametrically opposite the longitudinal axis of said shaft journal, said joints being arranged on a respective one of said crankpin sections.

12. A machine according to claim 8, wherein said crankpin is arranged at an acute angle with the longitudinal axis of said shaft journal, the longitudinal axis of said crankpin intersecting the longitudinal axis of said piston.

13. A machine according to claim 10, wherein said jacket encloses a further cylindrical generating chamber arranged opposite each of said one chamber and said second chamber, said generating chambers being arranged in a starshaped configuration in said jacket, said one piston and said second piston comprising double pistons each arranged to move in a respective oppositely disposed pair of said chambers.

14. A machine according to claim 10, including means arranged between said one piston and said second piston for transmitting radial forces therebetween.

15. A machine according to claim 10, including means arranged between said joints for transmitting forces in the direction of the longitudinal axis of said crankpin.

16. A machine according to claim 1, wherein said joint is pivotally mounted to said piston and reciprocatingly movable along said crankpin.

17. A machine according to claim 16, wherein said joint comprises a socket in said piston and a ball pivotally mounted in said socket forming a ball-and-socket joint, said ball having a bore therethrough, said crankpin extending through the bore of said ball.

18. A machine according to claim 1, wherein, during the reciprocating movement of said piston, said crankpin is constrained to orbit in a substantially circular path such that its longitudinal axis defines a cylindrical surface.

* * * * *